UNITED STATES PATENT OFFICE.

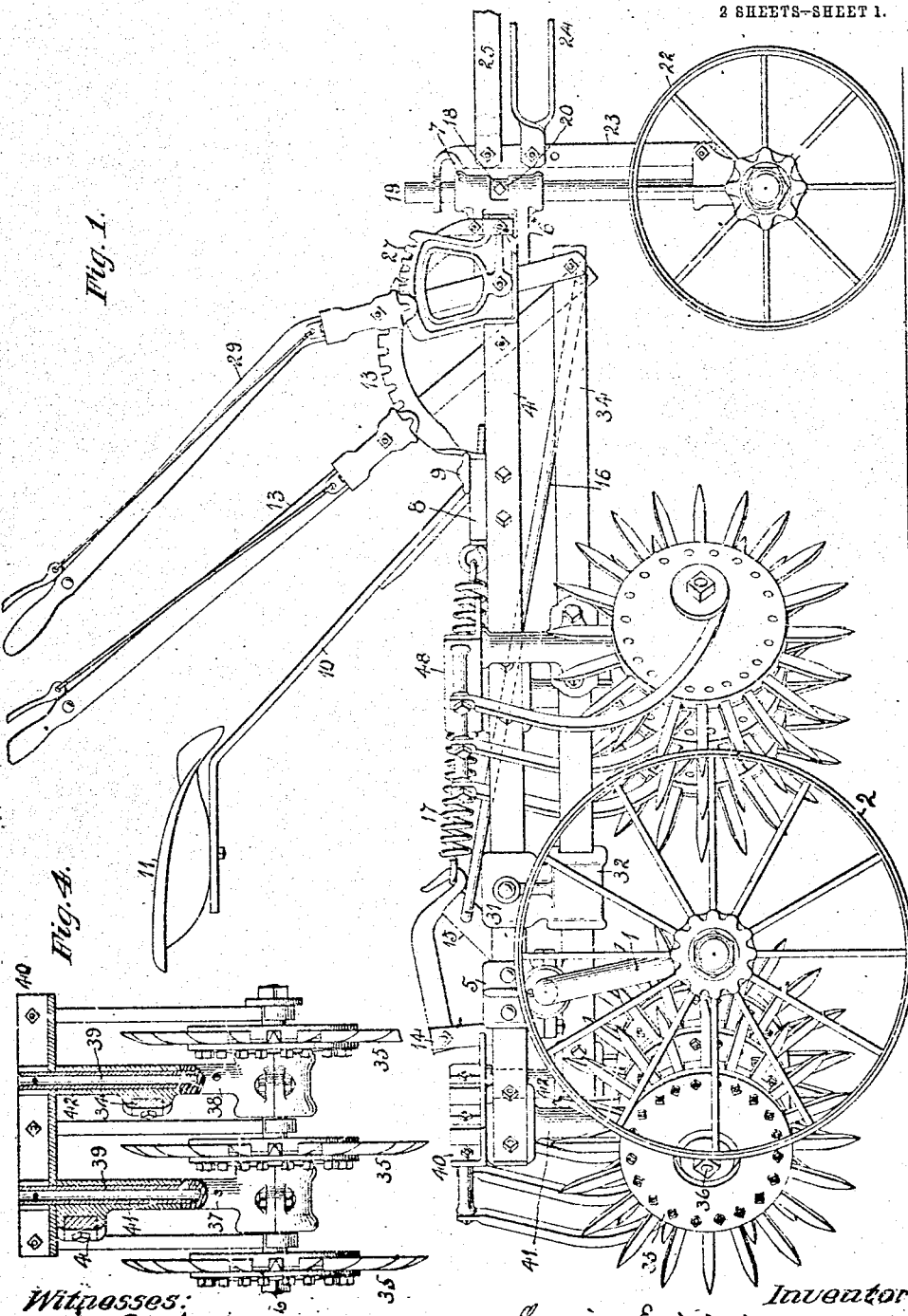

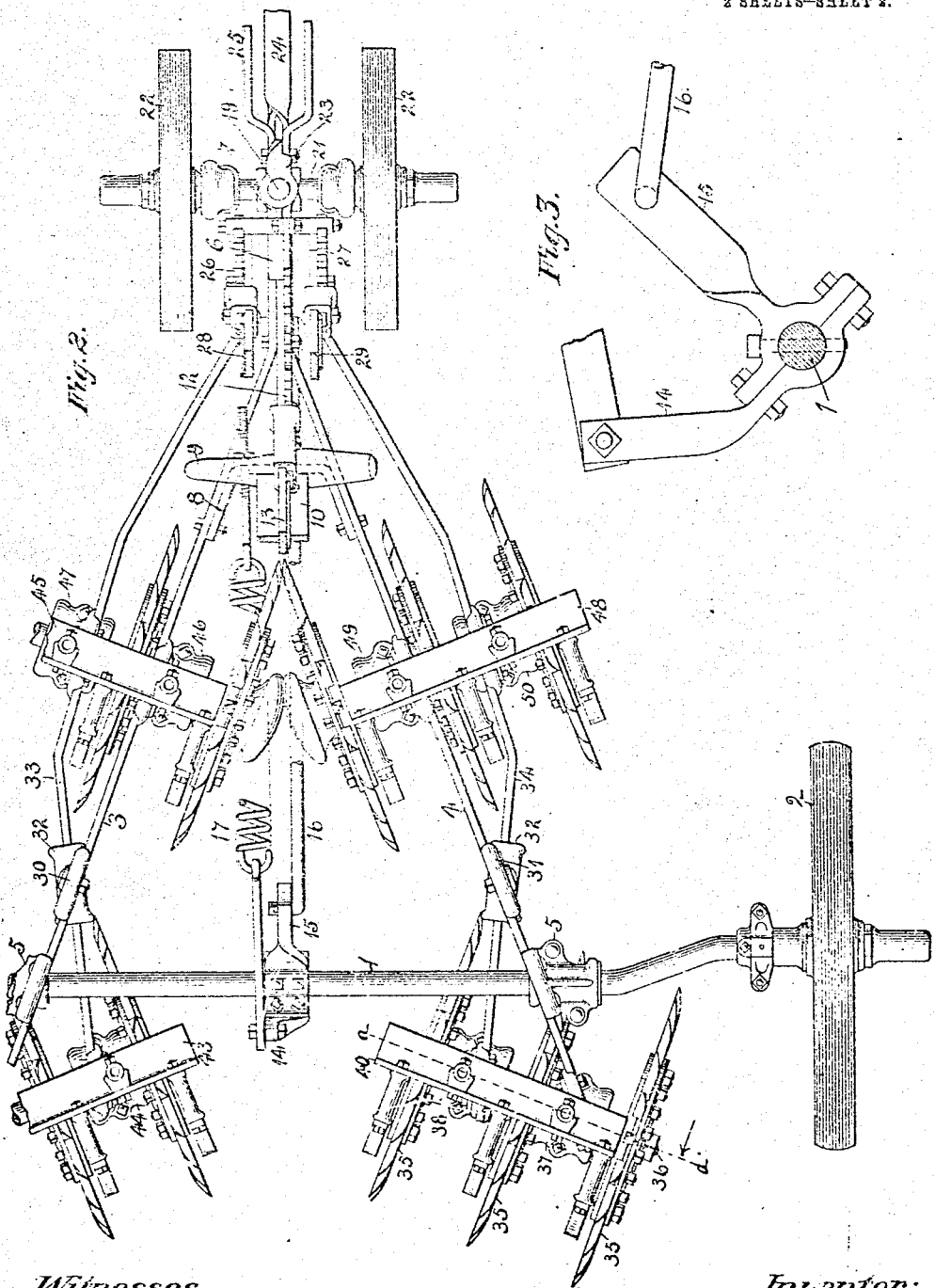

LEWIS E. WATERMAN, OF ROCKFORD, ILLINOIS, ASSIGNOR TO EMERSON-BRANTINGHAM COMPANY, OF ROCKFORD, ILLINOIS, A CORPORATION OF ILLINOIS.

HARROW.

984,625.  Specification of Letters Patent.  Patented Feb. 21, 1911.

Application filed April 23, 1909. Serial No. 491,643.

*To all whom it may concern:*

Be it known that I, LEWIS E. WATERMAN, a citizen of the United States, residing at Rockford, in the county of Winnebago and State of Illinois, have invented certain new and useful Improvements in Harrows, of which the following is a specification.

The object of this invention is to construct a harrow in which there are four sections suitably connected, and means for adjusting the sections diagonal to the line of draft, the two rear sections being adjustable outward and the two front sections being adjusted inward.

In the accompanying drawings, Figure 1 is a side elevation in which the sections are elevated. Fig. 2 is a plan view. Fig. 3 is a section of the connection of the lifting lever with the cranked axle. Fig. 4 is a section on dotted line *a a* Fig. 2.

My improved harrow is mounted on a supporting frame comprising the cranked axle 1 supported upon wheels 2. The bars 3 and 4 have a connection with the cranked axle 1 by the brackets 5 in a manner that the axle may turn therein. The forward ends of these bars 3 and 4 are connected to the arm 6 of the sleeve 7. A brace 8 connects the bars 3 and 4, and a foot rest 9 is connected to this brace. A seat support 10 has a connection with the brace 8, and a seat 11 is connected therewith. A toothed segment 12 has a connection with the arm 6 at one end and with the brace 8 at its other end. A hand lever 13 is located between the bars 3 and 4 is pivotally connected therewith, and is provided with the usual dog and thumb lever engagement with the toothed segment 12. To the axle 1 is fixedly connected a bracket having two arms 14 and 15. A rod 16 connects the arm 15 with the hand lever 13, and a spring 17 connects the arm 14 with the foot rest 9.

The sleeve 7 has a cut away portion within which is located a collar 18 held to the shank 19 by the set-screw 20. To the lower end of the shank 19 is connected an axle 21 and on this axle are located wheels 22. A bar 23 has its lower end connected to the axle 21, and its upper end encircling the shank 19 above the sleeve 7. To the bar 23 is connected a hitch 24, and above this hitch is and to the bar 23 is connected a tongue support 25.

By means of the hand lever 13 the cranked axle 1 can be rocked, thereby raising or lowering the rear portion of the frame, and by loosening the collar 18, the sleeve 7 connected to the forward end of the frame can be raised or lowered.

To the forward portion of the frame in rear of the sleeve are secured two toothed segments 26 and 27 each provided with a hand lever 28 and 29 respectively, and each having the usual dog and thumb latch connection with its segment.

The bar 3 has a bracket 30 secured thereto, and the bar 4 has a like bracket 31 secured to it. Each of these brackets is formed with a depending guide extension 32. A bar 33 has its forward end connected to the hand lever 28, and its rear portion is supported in the depending guide extension of the bracket 30. A bar 34 has its forward end connected to the hand lever 29 and its rear portion is supported in the depending guide extension 32 of the bracket 31. By means of the hand levers 28 and 29 the bars 33 and 34 can be moved through the extensions 32, of the brackets 30 and 31, and held when adjusted by the levers engaging the toothed segments 26 and 27.

At Fig. 4 is shown a vertical section, on dotted line *a a* Fig. 2, through one of the gangs supporting the toothed heads. There are four of these gangs, in this instance two forward of the cranked axle and two rearward thereof, and as the gangs are all of like construction, a description of one will answer. The toothed heads 35 are connected to a rod 36 which is held in bearings 37 and 38, and each bearing has a vertically arranged tubular standard 39 connected therewith. The upper ends of the standards 39 are connected to an angle-iron bar 40. Around the standard 39 of the bearing 37 is located a sleeve 41 to which the rear end of the bar 4 is bolted. Around the standard 39 of the bearing 38 is located a sleeve 42 to which the rear end of the bar 34 is bolted. As the sleeves 41 and 42 are located between the upper ends of the bearings 37 and 38 and the underside of the angle-iron bar 40, when the bars 4 and 34 are held elevated these bars will hold the toothed heads elevated.

As shown at Fig. 2, the bars 3 and 33 cross in their connection with the bracket 30 and the bars 4 and 34 cross in their connection with the bracket 31. The gang 43 has its inner bearing 44 connected to the rear end of the bar 33, and its outer bearing connected to the rear end of the bar 3. The gang 45 has its inner bearing 46 connected to the bar 3, and its outer bearing 47 connected to the bar 33. The gang 48 has its inner bearing 49 connected to the bar 4, and its outer bearing 50 connected to the bar 34. The bearings connected to the bars 3 and 4 form the pivotal points for their various gangs. By moving the hand lever 26, the gangs 43 and 45 are moved on their pivotal connections with the bar 3, and by moving the hand lever 27, the gangs 40 and 48 are moved on their pivotal connections with the bar 4. As the bars 33 and 34 are connected to the hand levers 28 and 29 respectively, and as they slide through the bearings 30 and 31 respectively, the gangs connected to the levers will be rocked on their pivotal connections with the bars 3 and 4. This rocking movement of the gangs will present the gangs in the positions shown in the drawings, or the front gangs and the rear gangs may be lined up so that the lengthwise direction of the gangs will be at right angles across the line of draft. When the gangs are in the positions shown in the drawings the teeth of the forward gangs point inward, while the teeth of the rear gangs point outward, so that the ground is practically gone over twice, and instead of being left in ridges is smooth.

I claim as my invention.

1. The combination of an axle, wheels supporting the axle, a front truck, a frame supported by the axle and truck, two gangs of earth agitating devices pivotally supported by the frame and located one in advance of the other, a lever, a bar connecting the lever with the inner end of one gang and the outer end of the other gang by which the gangs can be angled across the line of draft, and a slidable connection between the bar and frame between the gangs.

2. The combination of an axle, wheels supporting the axle, a front truck, a frame supported by the axle and truck, four gangs of earth agitating devices pivotally supported by the frame and located in pairs, two in advance of the others, two levers, two bars each connecting a lever with the outer end of a forward gang and the inner end of a rear gang by which the gangs can be angled across the line of draft, each bar having a slidable connection with the frame between a forward and a rear gang.

3. The combination with a support, of earth agitating devices pivotally connected thereto, and means for swinging said devices in opposite directions across the line of draft, said means including a link pivoted to the portion of one device on one side of its pivot axis and to the portion of the other device on the other side of its pivot axis.

4. The combination with a supporting frame, of earth agitating devices pivotally connected to the same, a lever, and a link pivoted to the lever, to one of the earth agitating devices on one side of its pivot axis and to the other earth agitating device on the other side of its pivot axis.

5. The combination with a support, of earth agitating devices pivotally connected thereto, and means for swinging said devices in opposite directions, said means including a connection between the portion of one device on one side of its pivot axis and the portion of the other device on the other side of its pivot axis, said connection having a sliding engagement with the support between its points of attachment to the agitating devices.

6. The combination with a supporting frame, of earth agitating devices pivotally connected thereto, a guide box carried by the frame between the devices, a lever fulcrumed on the frame, and a link pivoted to the lever and slidably engaged in the guide box, said link being pivoted to one of the earth agitating devices on one side of its pivot axis, and to the other earth agitating device on the other side of its pivot axis.

7. The combination with a support, of an agitator mounted thereon and comprising a rod, spaced boxes mounted on the rod and having standards, rotary heads mounted on the rods between the boxes, and a connection between the upper ends of the standards, sleeves journaled on the standards, between the boxes and connection, means securing one of the sleeves to the support, and operating means for turning the agitator, said means being connected to the other sleeve.

8. The combination with a supporting frame, of a pair of earth agitating devices pivoted thereto, a lever mounted on the frame in advance of the devices, and a single link element pivoted to the lever and to both devices but on opposite sides of their pivots to simultaneously effect the opposite movements of the devices on the movement of the lever.

In testimony whereof I have hereunto set my hand in presence of two subscribing witnesses.

LEWIS E. WATERMAN.

Witnesses:
A. O. BEHEL,
E. D. E. N. BEHEL.